United States Patent [19]

Klobucar

[11] Patent Number: 5,693,123
[45] Date of Patent: Dec. 2, 1997

[54] ROTARY CONCENTRATOR WITH EXTRUDED ADSORPTION BLOCKS

[75] Inventor: Joseph M. Klobucar, Detroit, Mich.

[73] Assignee: Durr Industries, Inc., Plymouth, Mich.

[21] Appl. No.: 657,178

[22] Filed: Jun. 3, 1996

[51] Int. Cl.[6] .................................................. B01D 53/06
[52] U.S. Cl. .............................. 96/125; 96/144; 96/146; 96/154
[58] Field of Search .................... 96/108, 123, 126, 96/135, 143, 144, 146, 150, 153, 154; 55/DIG. 5

[56] References Cited

U.S. PATENT DOCUMENTS

| Re. 21,004 | 2/1939 | Kopp | 96/144 X |
|---|---|---|---|
| 3,176,446 | 4/1965 | Siggelin | 96/125 X |
| 3,721,072 | 3/1973 | Clapham | 96/153 |
| 4,013,566 | 3/1977 | Taylor | 96/153 X |
| 5,057,128 | 10/1991 | Panzica et al. | 96/123 |
| 5,256,476 | 10/1993 | Tanaka et al. | 96/125 X |
| 5,288,306 | 2/1994 | Aibe et al. | 96/135 X |
| 5,356,852 | 10/1994 | DeLiso et al. | 96/146 X |

FOREIGN PATENT DOCUMENTS

| 59-100324 | 6/1984 | Japan | 96/125 |
|---|---|---|---|
| 5-023528 | 2/1993 | Japan | 96/153 |

*Primary Examiner*—Robert Spitzer
*Attorney, Agent, or Firm*—Howard & Howard

[57] ABSTRACT

A rotary concentrator is provided with homogeneous extruded adsorption blocks. In this way, greater air flow volumes can be processed since the flow passages can be made smaller as can the wall thicknesses. The present invention moves a slurry of adsorbent material, a solvent, and a binder into an extrusion die. The adsorption blocks are then extruded in the die. The blocks are then allowed to dry, and are placed in a rotary adsorption unit. In one embodiment, electrically conducted materials may be included in this slurry. An electric current may be placed on the blocks in the desorb portion of the cycle of the rotary adsorption unit. This heats the blocks, reducing the required volume of desorb gas.

18 Claims, 1 Drawing Sheet

U.S. Patent  Dec. 2, 1997  5,693,123
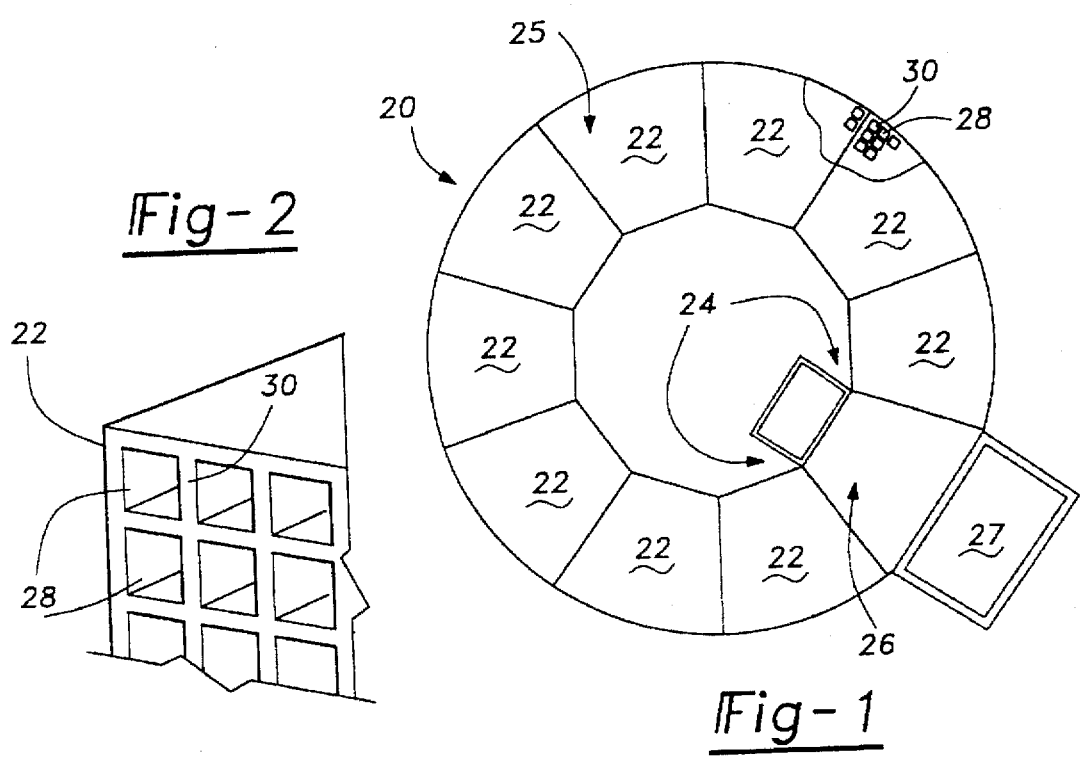
Fig-2
Fig-1
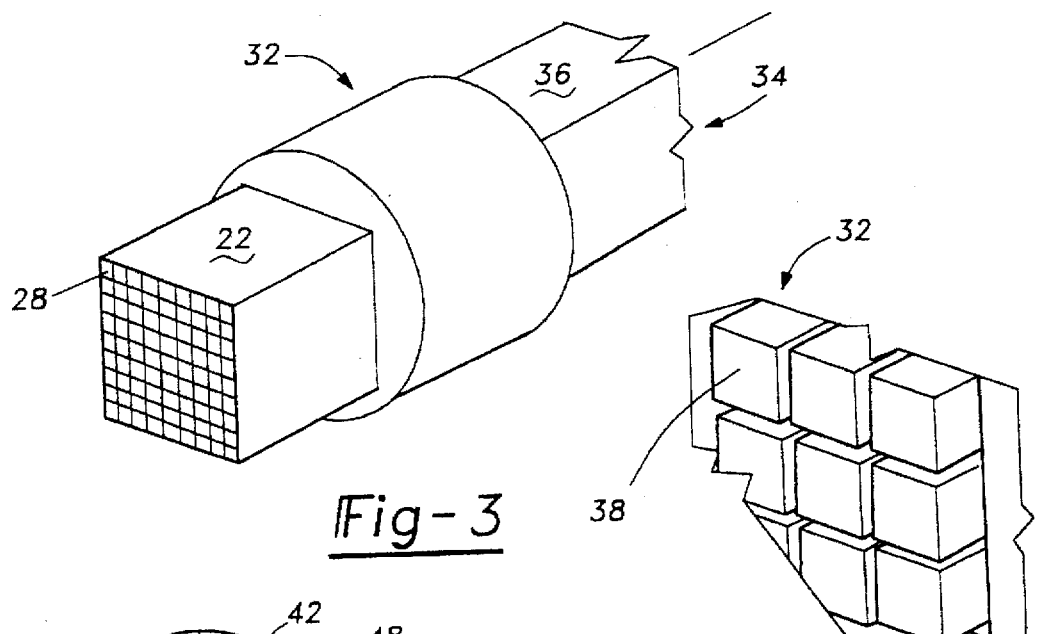
Fig-3
Fig-4
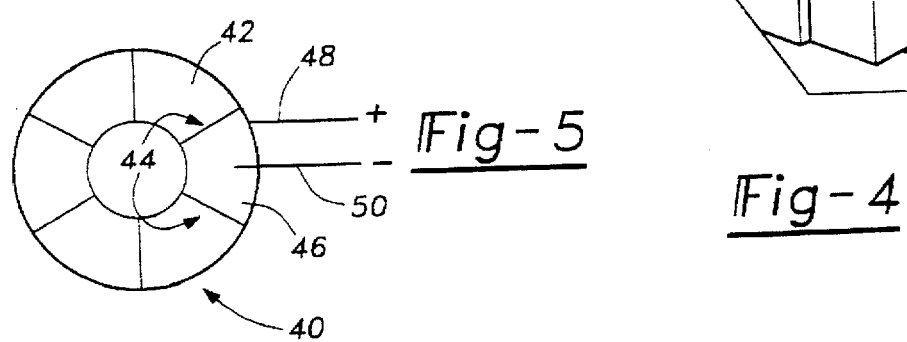
Fig-5

ROTARY CONCENTRATOR WITH EXTRUDED ADSORPTION BLOCKS

BACKGROUND OF THE INVENTION

This invention relates to the use of extruded adsorption blocks for a rotary concentrator.

In the prior art, rotary concentrators are utilized to clean high volume gas flows. A high volume dirty gas to be cleaned is passed over a rotating rotary unit. The dirty gas contacts the rotating unit over a large percentage of its rotating cycle. As an example, the dirty gas may be exposed to the rotary unit over 330° of rotation about a central axis of the rotary unit. Over this bulk of the rotation cycle the gas is exposed to adsorption blocks, which have parallel passages with an adsorption material in the passages. The adsorption material removes impurities from the gas flow.

Over the remaining portion of the cycle, a relatively small volume of hot desorb gas flow passes over the rotary unit. The desorb gas cleans away impurities left in the adsorption blocks from the dirty gas. In this way, the blocks are continuously utilized to clean the high volume gas flow, and then the blocks themselves are cleaned. The small volume desorb gas is passed to a second gas cleaning system. With the use of the rotary concentrator, only this small flow of gas must be sent to the second gas cleaning system. For that reason, rotary concentrators have enjoyed wide success.

Known adsorption blocks have some deficiencies. In particular, the blocks are typically formed by initially forming a base. The base is typically formed of ceramic fiber paper. The structure is composed of alternating layers of flat and corrugated ceramic fiber paper, which are bound together to form a matrix with parallel passages. Adsorbent material is then applied by saturating the matrix to form a slurry composed of finely powdered adsorbent, binder, and a solvent. The solvent is then dried leaving a coating of adsorbent material on the walls of the passages through the matrix. The use of the adsorbent slurry has undesirably restricted the size of the resultant passages to a large size. If the passages in the prior art matrix are too small, then the adsorbent slurry will plug the passages, rather than coating them. For that reason, the passages in the prior art have required rather large dimensions. In addition, since the walls are all built upon a base material and then coated, they are relatively thick.

It would be desirable to utilize relatively thin walls, and relatively small passages. This will increase the amount of air that can be processed by the rotary concentrator unit.

SUMMARY OF THE INVENTION

The present invention discloses the use of an extruded material to form the adsorption matrix. In this way, relatively small passages can be formed. There is no concern about a slurry plugging the passages. Rather, the passages are formed by an extrusion die. In addition, since the walls are formed of the adsorption material itself, relatively thin walls can be provided.

In one preferred embodiment of this invention, a slurry of a powdered adsorbent, a binder and a solvent, are all passed into a die. The die shapes the material into a generally honeycomb shape with a desired passage size and cell wall thickness. The solvent is then dried from the matrix and heat treating may be performed to set the binder. The extruded adsorption matrix therefore has adsorbent distributed through the entire thickness of the walls dividing the individual passages.

This matrix can have relatively smaller passages than have been possible with conventional adsorption blocks. In addition, relatively thinner walls can be achieved. This invention thus increases flow area and hence, treated gas volumes. Also, the thinner walls reduce the energy needed to drive the gas over the blocks, by increasing the percentage of the blocks that is flow area.

Finally, with the inventive extruded matrix, an electrically conductive material may be incorporated into the slurry. This allows an electric current to be passed through the matrix over a small percentage of the rotation of the rotary concentrator. This current heats the block to provide a portion of the desorb function. This heating reduces the required volume of desorb gas to achieve the desorb function.

These and other features of the present invention can be best understood from the following specifications and drawings, of which the following is a brief description.

BRIEF DESCRIPTION OF THE DRAWINGS

FIG. 1 is a schematic view of a rotary concentrator.

FIG. 2 shows one portion of an adsorbent matrix.

FIG. 3 shows a die forming the inventive matrix.

FIG. 4 is a view of a portion of the die.

FIG. 5 shows another feature of the present invention.

DETAILED DESCRIPTION OF PREFERRED EMBODIMENTS

FIG. 1 shows a rotary concentrator unit 20 which incorporates a plurality of adsorption matrix blocks 22. A frame structure supports and surrounds the blocks 22 as is known in the art. Over a large portion of the rotation cycle of the unit 20, shown here by numeral 24, dirty gas to be cleaned passes over the blocks 22. This is shown schematically by the air lines 25. The unit 20 rotates about its axis, and the dirty gas 25 passes over the blocks 22 to be cleaned. The blocks 22 have passages 28, and those passages include an adsorbent material which removes impurities from the gas flow. Over a relatively small portion 26 of the rotational cycle of the unit 20, a hot desorb gas 27 passes over the blocks to remove impurities from the passages 28. In this way, a relatively high volume of air 25 is continuously cleaned, while the desorb air 27 continuously cleans the passages 28 such that the blocks 22 can enter back into the cleaning area 24 as the unit 20 rotates. Appropriate baffles separate the section 26 from the section 24, and may be as known in the art.

The blocks 22 are inventive over the prior art. In particular, the blocks 22 are formed to have passages 28 by an extrusion die. The walls 30 between the passages 28 may be relatively thin. The blocks 22 are generally homogenous, since they are formed of an extrusion rather than by forming a paper matrix and then putting a slurry on that matrix as was the case in the prior art.

As shown in FIG. 3, a die 32 is forming matrix material 22. A slurry 34 leads into the die opening 36, and the extrusion die then forms the matrix 22. As shown in FIG. 4, the extrusion die 32 includes extrusion members 38 which form the passages 28. The extrusion technology needed to form this material may be as known in the art.

The prior art has extruded adsorbent blocks for other purposes; however, it has not utilized those blocks for rotary adsorption units. Preferred materials and methods are developed and available from Applied Ceramics of Atlanta, Ga. Thus, the technical features of how to form the blocks are as known in the art, although the invention itself is novel over the prior art. Generally, adsorption materials, a binder, and solvents are all mixed together into a slurry.

The adsorption material may include activated carbon, zeolite or porous polymers. Silicone dioxide, aluminum oxide, magnesium oxide, titanium dioxide and Kaolin, a type of clay, may be utilized as the binder. The solvent is typically water. Other materials may also be utilized. The preferred percentages and exact materials are known to a worker of ordinary skill in the art of forming adsorption blocks from extruded materials.

In general, the adsorbent preferably accounts for 10 to 100% of the slurry, by weight. Forty percent is deemed a nominal preferred amount, with 30 to 60% being preferred. The passage size is preferably 0.01–1 inch. Most preferably, 0.05 inch is considered a nominal size. The wall thickness is preferably 0.001–0.1 inch. Most preferably, the wall thickness is 0.007 inch.

The matrix depth in the direction of the air flow is preferably 0.1–40 inches. Most preferably, the blocks are approximately 10 inches in depth. The area of the passages preferably accounts for 40–95% of the overall surface area of the blocks. Most preferably, the open area accounts for 60–80%, and even more preferably approximately 77%.

In one preferred embodiment, an electrically conductive material is also included into the slurry. Preferred electrically conductive materials may be the carbon, or metal shavings. In this way, as shown in FIG. 5, the rotary concentrator 40 may include a plurality of blocks 42 which are cleaning air in the cleaning area 44 as in the prior art. However, in the desorb area 46, an electrical current source shown schematically by terminals 48 and 50, may heat the block. By heating the blocks themselves with electricity, a good deal of the desorb function can be achieved. This reduces the necessary volume of desorb air flow, and will also decrease time necessary for the desorption function. The electrical resistivity of such blocks is preferably 20 OHM inch. It is preferred that the electrical resistivity is between 0.1 and 1,000 OHM inch.

Preferred embodiments of this invention have been disclosed, however, a worker of ordinary skill in the art would recognize that certain modification would come within the scope of this invention. For that reason the following claims should be studied to determine the true scope and content of this invention.

I claim:

1. A rotary concentrator comprising:
a rotating frame for mounting a plurality of adsorption blocks and having a rotational cycle;
a gas flow system for directing a dirty gas to be cleaned to a majority of said rotational cycle of said frame, and a separate gas flow system for directing a clean desorb gas over a small percentage of the rotational cycle of said frame to clean said adsorption blocks; and
said adsorption blocks mounted in said frame, said adsorption blocks having parallel flow passages and said adsorption blocks all being formed of extruded material.

2. A rotary adsorption unit as recited in claim 1, wherein said adsorption blocks are generally homogeneous.

3. A rotary adsorption unit as recited in claim 2, wherein said adsorption blocks are formed of a slurry including an adsorbent material.

4. A rotary adsorption unit as recited in claim 3, wherein a binder is also included in said slurry.

5. A rotary adsorption unit as recited in claim 3, wherein an electrically conductive material is also included in said slurry.

6. A rotary adsorption unit as recited in claim 5, wherein an electric current is passed over said adsorption blocks in said small percentage of said rotational cycle of said frame to heat said adsorption blocks.

7. A rotary adsorption unit as recited in claim 2, wherein the passage sizes of said parallel passages in said adsorption blocks is between 0.01 and 1 inch.

8. A rotary adsorption unit as recited in claim 7, wherein walls are defined between adjacent passages, and said walls having a thickness of between 0.001 and 0.1 inch.

9. A rotary adsorption unit as recited in claim 2, wherein said parallel passages account for between 40 and 99% of the overall surface area of said adsorption blocks in a plane defined perpendicular to a gas flow direction through said adsorption blocks.

10. A rotary concentrator as recited in claim 9, wherein said parallel passages account for 60–80% of the overall surface area of said adsorption blocks.

11. A rotary concentrator comprising:
a rotating frame for mounting a plurality of adsorption blocks and rotating through a rotational cycle;
a gas flow system for directing a dirty gas to be cleaned to the majority of said rotational cycle of said frame, and a separate gas flow system for directing a clean desorb gas over a small percentage of the rotational cycle of said frame to clean said adsorption blocks; and
an electric current supply for supplying a current to said adsorption blocks over said small percentage of the rotational cycle of said frame, said adsorption blocks including an electrically conductive material such that said current heats said adsorption blocks.

12. A rotary concentrator as recited in claim 11, wherein said adsorption blocks are extruded, and said electrically conductive material is included in a slurry for forming said blocks.

13. A rotary concentrator as recited in claim 12, wherein said adsorption blocks are generally homogenous.

14. A rotary concentrator as recited in claim 12, wherein a binder is also included in said slurry.

15. A rotary concentrator as recited in claim 12, wherein said adsorption blocks having parallel passages the passage size of said parallel passages in said adsorption blocks is between 0.01 and 1 inch.

16. A rotary concentrator as recited in claim 15, wherein walls are defined between adjacent passages, and said walls have a thickness of between 0.001 and 0.1 inch.

17. A rotary concentrator as recited in claim 11, wherein said adsorption blocks include parallel passages which account for between 40 and 99% of the overall surface area of said adsorption blocks in a plane defined perpendicular to a gas flow direction through said blocks.

18. A rotary concentrator as recited in claim 17, wherein said parallel passages account for between 60 and 80% of the overall surface area of said adsorption blocks.

* * * * *